G. MEHRING.
VACUUM CONTROLLED SYSTEM FOR RADIATORS.
APPLICATION FILED OCT. 13, 1910.
999,329.
Patented Aug. 1, 1911.
3 SHEETS—SHEET 2.
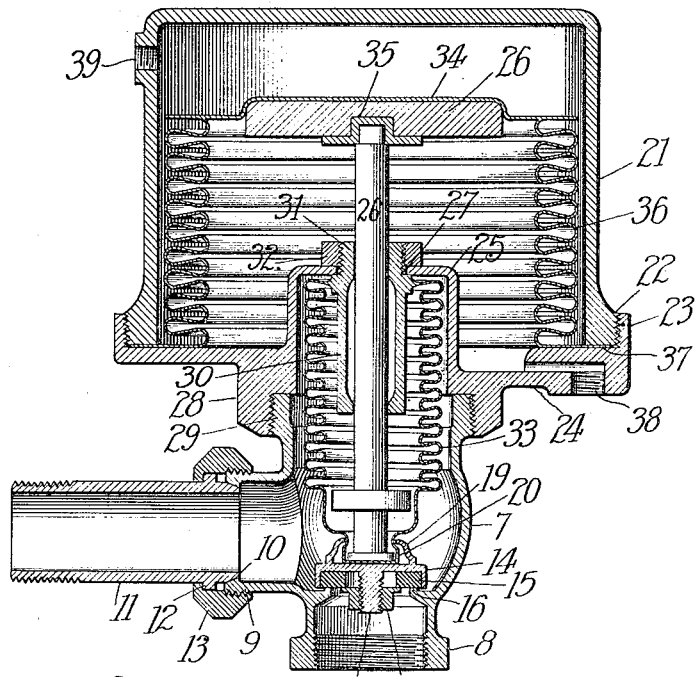
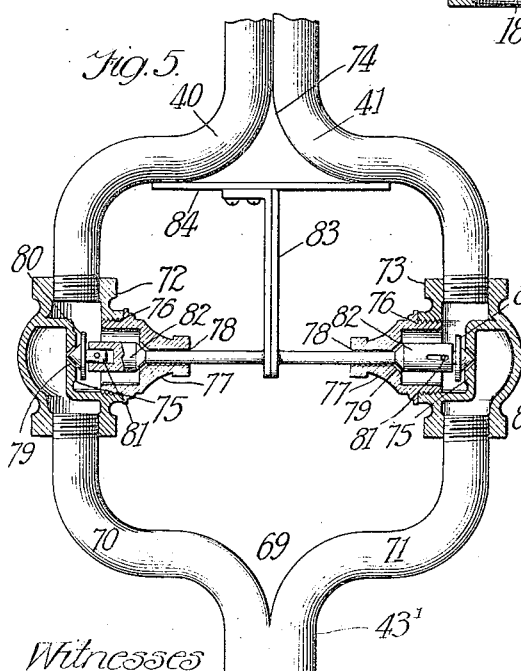
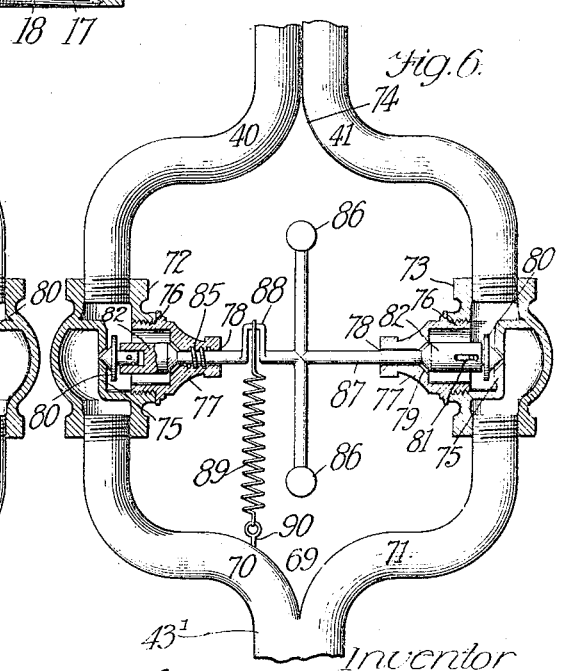
Witnesses
Martin H. Olsen.
Robert Dobberman.
Inventor
George Mehring
By Rector, Hibben, Davis & Macauley
John B. Macauley
Attys

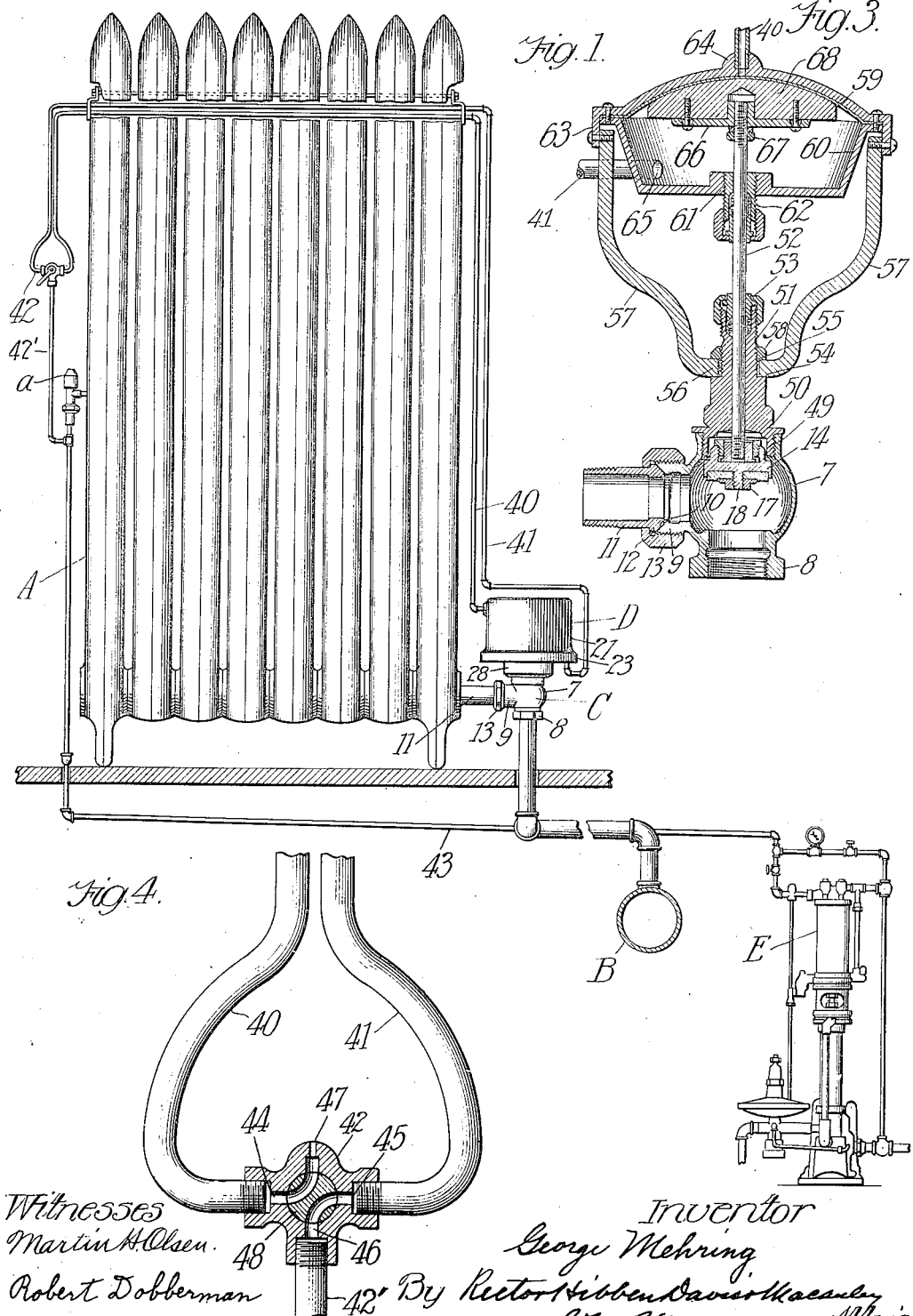

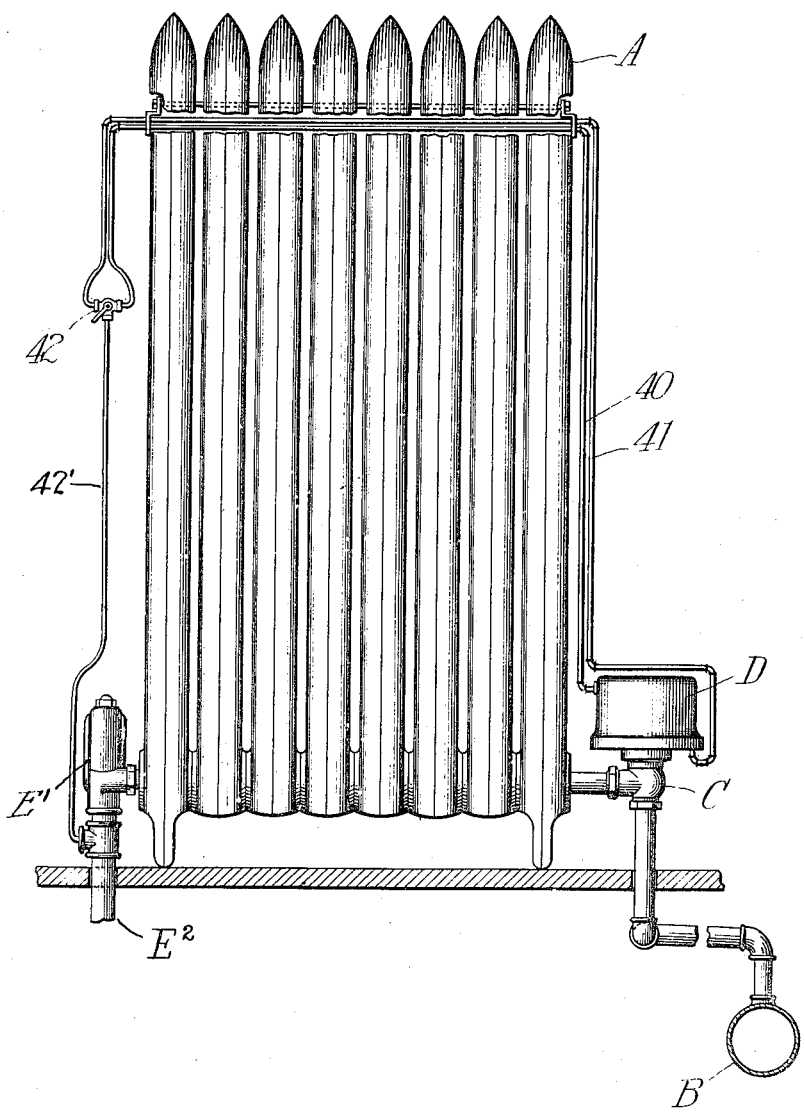

UNITED STATES PATENT OFFICE.

GEORGE MEHRING, OF CHICAGO, ILLINOIS.

VACUUM-CONTROLLED SYSTEM FOR RADIATORS.

999,329. Specification of Letters Patent. Patented Aug. 1, 1911.

Application filed October 13, 1910. Serial No. 586,877.

*To all whom it may concern:*

Be it known that I, GEORGE MEHRING, a citizen of the United States, residing at Chicago, in the county of Cook and State of Illinois, have invented certain new and useful Improvements in Vacuum - Controlled Systems for Radiators, of which the following is a specification.

Prior to the present invention it has been common practice to control the admission of steam or other heating fluid by a valve actuated by air or other pneumatic pressure. For this purpose a motor has been employed which consists of a chamber having a diaphragm or piston connected to the stem of the valve controlling the admission of heating fluid. The chamber on one side of the piston of such motor is connected to some suction means, as for example a vacuum pump, and the other side of the piston or diaphragm has been open to the air so that when the connection to the pump is open the air pressure forces the pump or diaphragm inward, or, as it is more commonly expressed, the suction draws the piston or diaphragm. A valve controlled by a thermostat or other means has been used to control the connection of the motor to a pump. In order to operate the piston or diaphragm in the other direction a spring has been employed and in order to relieve the vacuum and permit the spring to operate the movable element a small opening is usually formed in the casing which admits air constantly to the vacuum chamber. When the chamber is in communication with the pump, the operation of the latter is sufficient to overcome the air - admission. When, however, the pump is cut off by the valve, the air supplied quickly raises the pressure in the vacuum chamber and permits the spring to operate, the opening being made sufficiently large to permit this operation to take place within a reasonable time. It has further been proposed to use such a vacuum control in connection with a radiator system which otherwise employs exhausting mechanism. Two types of such a system are well known, in one of which a return pipe for the steam and water of condensation is employed, which is connected up to an exhaust pump to maintain the circulation of the steam in the system. Another well known system has no return pipe for the steam but employs an automatic air valve to free the radiator of air, to which valve a vacuum apparatus is connected for drawing off the air. In both these systems there is present a suction apparatus which may be utilized to operate the motor and thus dispense with any additional installation of pump. Examples of the use of such a motor in connection with these systems are shown in the patent to Hunter, # 776,783, Dec. 6, 1904. But it has been found that the vacuum control so applied to these systems is not entirely satisfactory, for a reason which I shall now explain. For the purpose of securing circulation or of keeping the radiators sufficiently free of air alone, a high vacuum is not essential. On the other hand, where a large number of radiators are connected in the system the air constantly drawn in through the openings in each of the several motors becomes in the aggregate a considerable quantity, necessitating, if a low pressure is to be maintained, an increased capacity on the part of the vacuum pump. Furthermore, since the vacuum must overcome the pressure of the springs above referred to, it has to be considerable or else an obtrusively large motor must be used to get the required power.

It is the object of my invention to overcome this objection to the employment of the vacuum or pneumatic motor in such systems and with this object in view I so construct and install my motors that they are operated in each direction by air pressure, thus dispensing entirely with the spring and also with the constantly open air vent.

In the drawings accompanying this specification and forming part of the application, Figure 1 shows my invention applied to that form of radiator systems in which there is no return pipe for the system but an air valve is employed to which is connected an exhausting means; Fig. 2 is a vertical sectional view of a preferred form of pressure motor; Fig. 3 is a similar view of an alternative form of motor; Figs. 4, 5 and 6, are views partly in section of various forms of valves for controlling the pressure in the motor; and Fig. 7 is a view of my invention as applied to a radiator system in which a return pipe for the steam and water of condensation is employed.

Referring more particularly to Fig. 1, the radiator A is of a well-known type and supplied with steam from a main B through a valve C. An air valve *a* is connected to the radiator on the one hand and to a vacuum pump E on the other, the latter connection being made by means of the pipe 43. The valve C is controlled and operated by a motor D, which is operated by differences in pressure upon opposite sides of its movable element.

In the preferred form of pressure motor shown in Fig. 2 the chamber thereof is connected directly with the casing of the valve. The valve casing is shown at 7 and is of a well-known form provided with an internally threaded connection at 8 and an external connection at 9, the latter having a ground seat 10 for the reception of the pipe section 11. The latter is provided with a flange or collar 12 for engagement with the coupling nut 13. The valve 14 is provided with a packing 15 to engage the seat 16 which packing is held in place by a nut 17 on a screw 18 formed integral with the valve. On its upper face the valve is provided with a flange 19 which surrounds a head 20 on the valve stem for securing the parts together for common movement.

The chamber of the pressure motor is formed in two sections, the upper of which is in the shape of a cylinder 21 open at its bottom and provided at its lower edge with an external screw thread 22 which engages an internal thread formed on a flange 23 on the bottom of the motor chamber. The bottom 24 of the motor chamber forms the top of the valve chamber and for this purpose is provided with a central upwardly extending hollow boss 25 apertured at 27 for the passage of the valve stem 26, and the bottom of the motor chamber is likewise provided with a downwardly extending annular flange 28 concentric with the boss and internally screw-threaded at 29 for connection with the upper open end of the valve casing. A sleeve 30 surrounds the valve stem near its upper end and projects through the opening in the boss 25, the projecting end being screw-threaded as at 31 for the reception of a nut 32 to secure it in position. Packing of the valve stem is dispensed with by employing a metallic bellows-like diaphragm 33 connected to the sleeve 30 at its upper end and extending beneath the head 20 on the valve stem and between the latter and the surrounding flange 19. The upper end of the valve stem supports a circular disk 34 to which it is secured by means of a socket 35. Another diaphragm 36 of the bellows type surrounds the valve rod 26 and disk 34 and is clamped at its lower edge between the meeting faces of the pressure chamber 21 and the bottom thereof 24, as shown at 37. Tapped openings 38 and 39 are provided in the bottom and side wall respectively of the motor chamber for the connection of the pipes through which pressure is supplied. These pipes shown at 40, 41, Fig. 1, are connected to a valve 42 which is in turn connected by a pipe to the connection 43 leading from the air valve a to the vacuum pump. The precise form of this valve is not material to my invention and in Figs. 4, 5 and 6 I have shown various modifications or forms which the valve may be given.

In Figs. 4 and 6 are shown valves which are intended and adapted for manual control, whereas in Fig. 5 I have shown a valve which is thermostatically controlled. It will be obvious, however, that other forms of valve might be employed without departing from the spirit of my invention. The form of valve shown in Fig. 4 is a four-way cock connected at opposite ports 44 and 45 respectively to pipes 40 and 41 and by an intermediate port 46 with the pipe 43. A port 47 opposite the port 46 leads to the atmosphere. The cock 48 may be of any well-known type with the usual handle. The operation of my system is obvious. With the cock 48 in the position shown in Fig. 4 air will enter the pipe 48 and the upper end of the motor D and at the same time be exhausted from the lower side of the motor through pipes 41 and 43, the steam valve 14 being thereby depressed upon its seat. To open the steam valve it is only necessary to revolve the cock a quarter turn whereupon the pipe 41 will be open to the atmosphere and the pipe 40 connected to the vacuum pump. The pressures in the pressure motor will be correspondingly changed and the valve raised to admit steam to the radiator.

While the form of pressure motor shown in Fig. 2 and heretofore described, is my preferred form, it is obvious that modification therein can be made without departing from the scope of my invention. Thus a piston movable in a cylinder might be substituted for the diaphragm, or as shown in Fig. 3, the diaphragm form of apparatus may be retained but the details thereof varied. In the last mentioned form the valve chamber 7 and valve 14 are substantially like those heretofore described with reference to Fig. 2. The open upper end of the valve-chamber, however, is internally threaded as at 49 to receive a cap 50 which is provided with an upward extension 51 through which the valve rod 52 extends and is packed by a gland 53 which may be of the usual type. At a point intermediate its base and upper end the cap is provided with a shoulder 54 and a reduced screw threaded portion 55 for the reception of a collar 56 having upwardly extending arms 57, 57, which support the pressure chamber. The nut 58 engaging the reduced screw threaded portion holds the collar in place. The motor chamber is formed of an upper and a lower section 59, 60, between which the edge of the diaphragm is clamped. The lower section is centrally bored at 61 and tapped for the reception of the gland 62 which surrounds the valve rod 52. The upper portion of the shell or casing is spherical and provided with depending ears 63 which are screwed to the supports 57 and provided with a socket 64 for the reception of the end of one of the pipes 40 connecting to the control valve 42. The lower section of the casing is bored at 65 for the reception of the end of the other pipe 41. The valve stem is screwed into a socket 66 and secured in position by the set nut 67, the socket being suitably connected to a disk 68 the upper surface of which is spherical in configuration to conform to the interior of the upper section of the motor casing. The operation of this pressure motor is substantially like that of the motor shown in Fig. 2 and heretofore described but whereas the first described modification requires no packing between the valve chamber and the motor chamber the construction shown in Fig. 3 requires two packings.

In the pressure controlling means shown in Fig. 5 the connection 43' to the vacuum pump is branched at 69, the branches 70 and 71 diverging to a pair of valve casings 72, 73, which are duplicates in every respect. Above the valves the pipes or conduits are again brought together as at 74 though they do not merge but lead separately to the spaces above and below the movable septum of the motor as heretofore described. Each valve casing contains the usual seat 75 and the internally threaded opening 76 with which latter engages a cap 77. Each cap 77 is provided with a bore 78 for the passage of the valve stem, the bore at its inner end terminating in a valve seat 79. Each valve 80 is attached to its stem by a lost motion connection 81 and the stem which is enlarged as at 82 inside the valve casing is provided with a valve shoulder 83 which engages the valve seat 79. The valve stem does not closely fit the bore in the valve cap but on the contrary is of materially less diameter so that when the valve 83 is away from its seat 79 air may freely enter around the valve stem. The lost motion connection heretofore referred to permits the seating of the valve 80 except when the valve stem is in its outermost position. The two valve stems are connected to a bi-metallic thermostat 83 on opposite sides of the same and the thermostat is supported from a plate or bar 84 spanning the pipes 40, 41 in the position shown. It will be obvious from the description given above that as the valves are moved to admit air to one of the pipes 40 or 41, the admission of air to the other pipe is cut off and the connection to the vacuum pump opened.

In the form of valve mechanism shown in Fig. 6 the valves and their casings are substantially like those described in connection with Fig. 5 but one of the valve stems is provided with a thread 85 which meshes with the corresponding thread in the cap 77 and buttons 86 mounted on arms rigidly connected to the common valve stem 87 serve to partially rotate the latter and reciprocate the valves. The valve stem 87 is also provided with a cranked or offset portion 88 intermediate its ends to which is secured a spring 89 anchored at the other end in an eye 90 mounted on pipe 70. When the crank 80 is turned past its intermediate position in either direction the spring 89 will tend to retain it against a reversal until sufficient pressure is applied to one or the other buttons to overcome the tension of the spring. Either of the last described valves can be substituted for the more simple turning plug shown in Fig. 4 and described in connection with the entire system, or as will be obvious a variety of other forms of valve is adapted to this purpose.

It will now be clear from the above description that in my system of vacuum control for radiators motors of comparatively small size may be used without requiring a high vacuum to be maintained and also without greatly increasing the capacity of the vacuum pump employed. By dispensing with the spring it is only necessary to overcome the friction of the parts in moving the valve and to supply sufficient pressure to maintain the latter on its seat when the valve is to be kept closed. There is no constantly maintained admission of air to be counteracted but, on the other hand, air is only admitted when the position of the valve is changed as will be readily understood. Both these advantages are achieved with only the comparatively immaterial addition to the cost of the installation occasioned by the necessity for a double instead of a single piping from the control valve 42 to the motor. It will also be apparent that by employing the specific form of motor formed with the cap of the valve casing illustrated in Fig. 2, packing is dispensed with and leakage of steam avoided, and attention may be called in this connection to the fact that any leakage which might occur would escape into that portion of the pressure chamber surrounding the valve stem and be drawn off by the suction pump whenever communication is opened thereto from beneath the diaphragm.

In Fig. 7 my improvement is shown attached to another of the forms of radiator systems heretofore referred to. In this system the steam supply pipe and the valve controlling the same and radiator may be substantially like that heretofore described, but a return pipe for steam and condensation is employed which is shown at $E^2$ in the drawing with the usual trap $E'$. In this case a low pressure is maintained in the pipe $E^2$ by a suitable suction pump E and the low pressure pipe 42' from the valve 42 is tapped into a T in the pipe E². By this means the valve 42 may connect either pipe 40 or 41 with suction, the construction and operation of the motor D being as heretofore described in connection with the system shown in Fig. 1.

What I claim is:

1. In a steam heating system including a radiator and suction means communicating with the interior of the radiator, the combination of a valve for controlling the passage of heating fluid thereto, a double acting pressure motor connected to the valve for operating the same and having a movable septum, said suction means connected to the motor on both sides of the movable septum, and means for opening connection between the suction means and either side alone of the septum and for simultaneously effecting communication between the opposite side of the septum and a source of higher pressure.

2. In a steam heating system comprising a radiator and suction means communicating with the interior of the radiator, the combination of a valve for controlling the admission of heating fluid thereto, a double acting pressure motor connected to the valve for operating the same, said suction means connected to opposite ends of the motor, and means for opening the connection between the suction means and either end alone of the motor and for simultaneously effecting communication between the opposite side of the motor and a source of higher pressure.

3. In a steam heating system comprising a radiator and suction means communicating with the interior thereof, the combination of a valve for controlling the passage of heating fluid to the radiator, a double acting motor having a sheet metal bellows diaphragm controlling the valve, connections from said suction means and a source of higher pressure to opposite sides of the diaphragm, and means for opening the connection between the suction means and either side alone of the diaphragm and for simultaneously effecting communication between the opposite side of the diaphragm and a source of higher pressure.

4. In a steam radiator system comprising a radiator and suction means connected to the interior thereof, the combination of a valve for controlling the flow of heating fluid to the radiator, a double acting pressure motor having a movable septum for actuating the valve, a valve and connections for connecting the suction means with either side of the pressure motor adapted to connect either side alone of the septum with the suction means and simultaneously effect communication of the opposite side of the septum with a source of higher pressure.

5. In a radiator system, the combination of a radiator, means for supplying steam thereto and suction means communicating with the interior of the radiator, a valve for controlling the circulation of steam through the radiator, a motor connected to the valve for operating the same, consisting of a movable septum arranged in a chamber, means for opening the connection between the suction means and either side alone of the septum and for simultaneously effecting communication between the opposite side of the septum and a source of higher pressure.

6. In a radiator system the combination of a radiator, means for supplying steam thereto, a suction apparatus connected with the interior of the radiator, a valve controlling the circulation of steam through the radiator, a motor for operating the valve consisting of a chamber having a movable septum therein, connections from the opposite sides of the septum to said suction means, a valve for controlling the connections from the motor chamber to the suction means, and also for controlling the admission of air to the motor.

GEORGE MEHRING.

Witnesses:
 ROBERT DOBBERMANN,
 LOUIS B. ERWIN.